United States Patent
Schmidt et al.

(10) Patent No.: US 7,072,765 B2
(45) Date of Patent: Jul. 4, 2006

(54) ROUTE CALCULATION METHOD

(75) Inventors: Heinrich Schmidt, Diekholzen (DE); Joerg Hoeveling, Giesen (DE); Ralf Hoffmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 287 days.

(21) Appl. No.: 10/343,407

(22) PCT Filed: Jul. 24, 2001

(86) PCT No.: PCT/DE01/02794

§ 371 (c)(1),
(2), (4) Date: Sep. 10, 2003

(87) PCT Pub. No.: WO02/10687

PCT Pub. Date: Feb. 7, 2002

(65) Prior Publication Data

US 2004/0049335 A1  Mar. 11, 2004

(30) Foreign Application Priority Data

Jul. 28, 2000  (DE) ................................. 100 36 817

(51) Int. Cl.
*G01C 21/34* (2006.01)
(52) U.S. Cl. .................. 701/209; 701/202; 340/995.19
(58) Field of Classification Search ................ 701/202, 701/209, 210; 340/995.19, 995.21
See application file for complete search history.

(56) References Cited

U.S. PATENT DOCUMENTS

| 5,793,631 | A | * | 8/1998 | Ito et al. ...................... 701/211 |
| 5,977,885 | A | * | 11/1999 | Watanabe .............. 340/995.19 |
| 6,064,941 | A | * | 5/2000 | Nimura et al. ............... 701/210 |
| 6,505,117 | B1 | * | 1/2003 | Ratert et al. ................ 701/209 |
| 6,912,463 | B1 | * | 6/2005 | Miwa .......................... 701/213 |
| 2003/0033078 | A1 | * | 2/2003 | Kita et al. ................... 701/117 |
| 2003/0236617 | A1 | * | 12/2003 | Yamada et al. ............. 701/209 |
| 2004/0059500 | A1 | * | 3/2004 | Nakano ..................... 701/211 |
| 2005/0038600 | A1 | * | 2/2005 | Sakai et al. ................. 701/209 |

FOREIGN PATENT DOCUMENTS

| EP | 0 827 126 | 3/1998 |
| JP | 09 325 041 | 12/1997 |
| JP | 2000 088 594 | 3/2000 |

* cited by examiner

*Primary Examiner*—Gary Chin
(74) *Attorney, Agent, or Firm*—Kenyon & Kenyon, LLP

(57) ABSTRACT

A method for calculating a route from a starting location to a destination location is described; it is characterized in that the route is calculated after specifying at least one passthrough destination location by way of at least one passthrough destination point, which is situated in a circumscribed area of the at least one pass-through destination location specified by a specified criterion.

In contrast with the route calculation method known from the related art, the specified pass-through destinations are not part of the trip route, but instead, except for a specified circumscribed area, they function as vaguely specified interpolation points for influencing the route calculation.

9 Claims, 1 Drawing Sheet

ROUTE CALCULATION METHOD

BACKGROUND INFORMATION

The present invention is directed to a method for calculating a route from a current location to at least one destination location via at least one pass-through destination location according to the preamble of the independent patent claim.

Vehicle navigation devices available and distributed today, e.g., by the company Blaupunkt-Werke GmbH, Hildesheim, allow automatic route calculation from the current vehicle position to the destination location input (after user input of a destination location), and they guide the driver of the vehicle along the calculated trip route from the particular instantaneous vehicle location to the destination location by outputting trip instructions, preferably acoustic instructions.

The route calculation is usually performed by taking into account a specified or user-specifiable optimization criterion such as the quickest or shortest route from the current location to the destination location. There is no provision for taking into account user preferences with regard to a certain preferred trip route or a certain preferred segment of road.

Such user preferences may be based, for example, on the fact that the user has detailed information regarding traffic obstacles on certain roads or segments of roads around which he must detour, or the driver may prefer known segments of road at the expense of a slight detour in comparison with segments of road with which he is not familiar. In addition, user preferences may also be based on a shortening of the time and/or distance that is possible by giving preference to well-developed state or federal highways over freeways, for example.

If the driver of a vehicle would like to be directed from a current position to a destination over a certain route, then in the case of known navigation devices, it is currently advisable to input intermediate destinations which prompt the navigation device to calculate a route from the current location to the intermediate location and from there to the actual destination location and thus to take into account certain preferred sections of road in the route calculation.

This method has the disadvantage that after the route calculation, the vehicle is navigated from the current location to the destination location by way of intermediate destinations input in such a way that the vehicle is navigated to the next intermediate destination until actually reaching the intermediate destination. This does not allow passing merely in the vicinity of the intermediate destination, as might actually be desired.

Advantages of the Invention

The method according to the present invention having the features of the independent claim has the advantage over the related art that it permits a route calculation via user-defined pass-through destinations (the term "pass-through destination" is used intentionally to differentiate it from the intermediate destinations mentioned above), so they are used as interpolation points for forcing certain preferred roads or segments of roads to be included in the route calculation without actually having to reach these destinations in a subsequent navigation. This is achieved according to the present invention by the fact that after at least one pass-through destination location has been specified, a pass-through destination point is determined automatically for each of the at least one pass-through destinations, this destination point being situated in a circumscribed area of the at least one pass-through destination location determined by a specified criterion, and the route is calculated via the at least one pass-through destination point.

Thus, the pass-through destination(s) is/are not a part of the trip route, but instead the pass-through destination(s) is/are passed by only at a minimum distance defined by the circumscribed area.

Advantageous refinements of the method according to the present invention are characterized in the dependent claims.

The method according to the present invention is advantageously implemented in such a way that in a first step, the starting location is set as the starting point for the route calculation, and a first of the at least one pass-through destination locations is set as the pass-through destination;

in a second step, a route segment from the starting point to the pass-through destination point, which is determined automatically and is situated in an interception range around the pass-through destination, determined according to the specified criterion;

in a third step, the end point (=pass-through destination point) of the previously calculated route segment is set as the starting point for the calculation of an additional route segment;

in the case of additional pass-through destinations, the next of the at least one pass-through destination locations is set as the pass-through destination, and the sequence is continued with the second step;

in the case when there are no other pass-through destination locations in a fourth step, the route segment from the starting point set in the third step to the destination location is calculated, and the route is obtained by arranging the calculated route segments in a sequence.

The specified criterion may advantageously be a specified distance from the pass-through destination in the form of a fixedly defined distance value, in the form of a distance value derived from calculated route information, in particular the calculated route length or a case-specific, fixedly defined distance value or derived from calculated route information, depending on which distance value is greater.

The specified criterion may also advantageously be a change in the class of road, which is necessary to reach the pass-through destination, in particular a required change from one class of road to a lower class of road.

The specified criterion may also advantageously be one of the aforementioned distance criteria or a change in the class of road on a case-by-case basis, depending on which criterion defines a larger circumscribed area.

DRAWINGS

Exemplary embodiments of the present invention are illustrated in the figures and explained in greater detail below.

DESCRIPTION OF THE EXEMPLARY EMBODIMENTS

The present invention is described below using the example of a vehicle navigation device which is provided for use in a motor vehicle, and a method of route calculation in a vehicle navigation device. However, this is not to be understood in the sense of a restriction. Instead, the present invention is also equally applicable to navigation devices intended for other types of applications, e.g., navigation devices for other means of transport or also as a navigation aid for pedestrians in an area of a city with which they are not familiar. For this purpose, it is necessary only to essentially adjust the database of the navigation device accordingly. Then in the last case of a navigation aid for pedestrians, specified landmark buildings or comparable landmark points suitable for use as reference points for the route calculation, preferably in the form of roadway intersections, are pass-through destinations to be defined by the user. Other intended applications of the route calculation method according to the present invention are also conceivable and are within the scope of the present invention.

Figure 1:
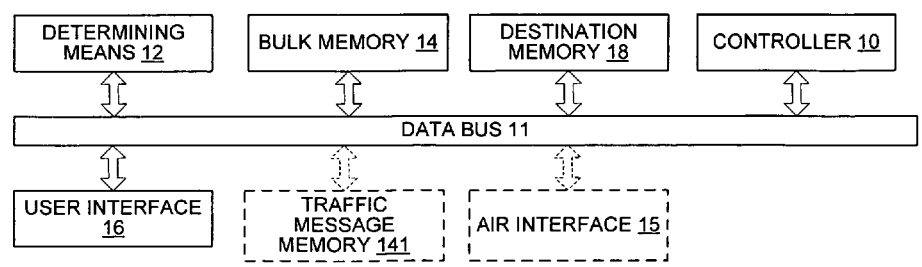
FIG. 1 shows schematically a block diagram of the part of a navigation device which is essential to the present invention for implementing the method according to the present invention.

Navigation device 1 shown in FIG. 1 for implementing the method according to the present invention has position determining means 12 for establishing a current location of the navigation device or the vehicle in which the navigation device is operated.

Position determining means 12 include in an essentially known manner means for implementing a dead reckoning, i.e., the current location of the vehicle is determined from the distance traveled and information regarding the direction of travel.

For example, the tachometer signal may be used to determine the distance traveled. This is in turn determined from pulses of radar sensors of an ABS (=anti-lock system) which generate a pulse train as a function of the rotation of a vehicle wheel, and from a known wheel circumference. The direction information is determined by a rotational rate sensor which detects changes in direction, so that the particular direction of travel at the moment is determinable on the basis of a known starting direction of travel on the basis of a change in the rotational rate of the rotational rate sensor. The current location of the vehicle may be calculated in each case from the information representing the direction of travel and the distance traveled.

Position determining means 12 also include a receiver for GPS (=global positioning system) signals, i.e., signals emitted via satellites for determination of position, which also allows the current vehicle position to be determined.

Position determining means 12 also include a computing unit which links the position information of the GPS receiver to that of the dead reckoning to form a resultant vehicle position. In addition, the position determining means compare the vehicle position thus determined with traffic route information stored in a bulk memory 14 as a plausibility check and thereby determine a most probable current vehicle location. This last step is known as map matching.

The information determined by position determining means 12 regarding the current vehicle location is sent to a controller 10, the function of which is explained in greater detail below.

Bulk memory 14 of navigation device 1 is implemented preferably in the form of a CD-ROM drive with the data CD inserted, but other embodiments of bulk memory 14 are also conceivable. Map information, in particular information regarding the location of landmarks, e.g., locations and cities together with the particular place names unambiguously identifying the landmarks, is stored in bulk memory 14. In addition, the bulk memory also contains information regarding the traffic routes connecting these landmarks, such as in particular freeways and roads of lower road classes such as federal and state roads, county roads, local through roads, etc. together with a feature characterizing the class of road.

In addition, the navigation device includes a communication interface which has an input device, preferably in the form of a keyboard, and an output device, which is preferably visual and acoustic.

The input device of user interface 16 is used for inputting a destination to which a trip route is to be calculated and then the driver of the vehicle is to be led. In addition, the input device also serves to input one or more pass-through destination locations over which the route to be calculated should lead to the destination location.

The output device supports the user in inputting the destination location or one or more pass-through destinations so that, for example, the letters of a place name that have already been input are displayed visually on the output device. In addition, proposals selected for place names on the basis of the letters already input may be offered for selection by the user. The output device is also used for outputting, preferably acoustically, navigation instructions for directing the driver of the vehicle along the calculated trip route. These destination instructions preferably include instructions for turning from the road on which the vehicle is currently traveling to another road and instructions regarding the distance to the turning point, e.g., in the manner of "turn left after 100 meters," etc.

In addition, navigation device 1 has a destination memory 18 in which a destination that has been input via user interface 16 is stored along with pass-through destination locations that have been input via user interface 16.

The components described here, namely position determining means 12, bulk memory 14, user interface 16, and destination memory 18 access a data bus 11 of navigation device 1 which is connected to a controller 10 of navigation device 1 and is preferably controlled by the controller. In addition, individual components are able to communicate automatically with other components; for example, the computer of position determining means 12 may automatically access bulk memory 14 to call up map data required for map matching out of bulk memory 14.

To prevent access conflicts in accessing data bus 11, the access is handled according to a suitable protocol, e.g., the essentially known CSMA/CD (=carrier sense multiple access/collision detection) protocol.

Controller 10 controls the functions of navigation device 1 and is preferably implemented in the form of an operating program built into a microprocessor. In conjunction with the present invention, controller 10 also has the following functions in addition to the functions known for traditional navigation devices:

receiving the destination and pass-through destination locations that have been input via user interface 16;

allocating the coordinates available in bulk memory 14 for the destinations and pass-through destinations or allocating other information characterizing the location of the destinations and pass-through destination locations to the destinations and pass-through destinations that have been input;

storing the destination and pass-through destination locations and the information characterizing their positions in destination memory 18;

sorting the destination and pass-through destination locations stored in destination memory 18 according to increasing distance from the current position of the vehicle or according to decreasing distance from the destination location on the basis of a comparison of the coordinates of the pass-through destination locations with those of the current position or destination; and calculating a trip route, optimized according to a specified criterion, from the current position of the vehicle to the destination via the pass-through destination locations that have been input using user interface 16;

as explained in greater detail below in conjunction with the description of the method according to the present invention.

In an alternative embodiment of navigation device 1 described here for implementing the method according to the present invention, an air interface 15 is connected to data bus 11.

According to a first variant of the alternative embodiment, air interface 15 is implemented in the form of a radio receiver which is designed for reception and decoding of TMC (=traffic message channel) information transmitted via RDS (=radio data system) by radio in encoded form. According to the first variant of the alternative embodiment, a traffic message memory 141 is provided for storage of the traffic information received by radio and is also connected to bus 11 of navigation device 1. The traffic messages thus stored are intended to supplement the traffic route information stored in bulk memory 14. The navigation device thus always has current information regarding the condition of the traffic routes, which is taken into account in performing an optimized route calculation. This procedure is essentially known as dynamic navigation and therefore needs no further explanation here.

According to a second variant of the alternative embodiment, air interface 15 is designed in the form of a cell phone. Current information regarding the condition of traffic routes may be called up from a provider having access to the corresponding data in a manner similar to that used in the case of radio. In addition, however, the cell phone also permits partial or complete off-board navigation, as it is called. In this method, after a destination and at least one pass-through destination has been input via user interface 12, this data and information regarding the current position of the vehicle is sent to a provider. The provider then calculates a route from the current position to the destination by way of the at least one pass-through destination on the basis of the traffic route information available to the provider and, if necessary, current information regarding the condition of these traffic routes. The calculated route is then transmitted from the provider to the navigation device by way of cell phone 15 entirely or in sections in response to an inquiry and the navigation device performs a navigation on the basis of the externally calculated route.

Figure 2:
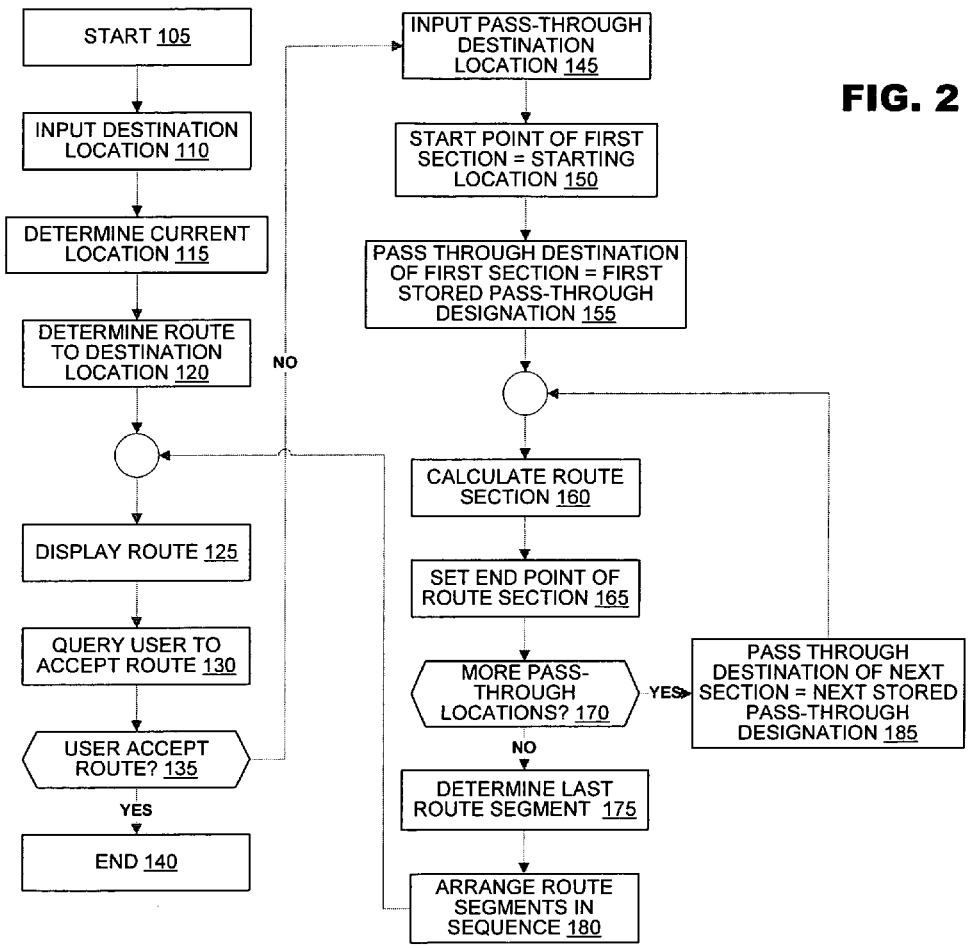
FIG. 2 shows a simplified flow chart of the method according to the present invention.

The method according to the present invention is described in greater detail below on the basis of the flowchart according to FIG. 2.

The method begins with starting up the navigation device in step 105.

Then a destination to which a trip route is to be calculated, starting from the instantaneous location of the vehicle, is input in a step 110 by the user using the input means of user interface 16 as explained below, for example, on the basis of the following examples.

The driver of the vehicle would like to drive from his current location, e.g., Stuttgart-Feuerbach, to Saarlouis, for example, in the Saarland. The name of the destination is Saarlouis. To input this destination place name, the user enters the letter "S." Then controller 10 in the database of bulk memory 14 determines the first place names beginning with the letter "S" input. Let us assume this is the place name "Saarbrücken," for example. In addition, controller 10 triggers user interface 16 to display the place name "Saarbrücken" thus determined, which can then be selected by actuation of a confirmation key on user interface 16. However, since Saarbrücken is not the desired destination in the present case, the user will enter the second letter "a" of the destination name. Then the navigation device will suggest the next place name in the bulk memory beginning with the letters already input, i.e., "Saarburg," for example. This procedure is continued until the navigation device proposes the desired place name on the basis of the letters input or the user has entered the name completely. The position information, i.e., preferably coordinates, assigned to the input destination place name in bulk memory 14 is read out of the bulk memory by controller 10, which enters this information together with the destination place names in destination memory 18.

After concluding input of the destination location, the current location of the vehicle is queried by position determining means 12 via bus 11 (step 115).

Based on the current vehicle location, navigation device 1 or, more precisely, controller 10 determines a route to the destination location (step 120) with access to the traffic route information stored in bulk memory 14, according to the alternative embodiment using a radio receiver for reception of traffic information, with additional consideration of current traffic route condition information.

After completing the route from the current vehicle location to the destination location input, controller 10 controls user interface 16 to display the calculated route preferably in the form of a road map with landmarks entered such as the names of cities, towns, municipal districts, parts of towns or streets and also with labeling of the relevant traffic routes and, for example, the road segments to be traveled may be stored in color, depending on the suitable degree of detailing (step 125). In addition, information regarding the length of the calculated trip route and a presumed trip duration may also be displayed.

In the case of the example described above of a planned trip from Stuttgart-Feuerbach to Saarlouis, the navigation device calculates a route as shown by the following description of a route, for example.

Description of the trip route without user specification of pass-through destinations:

| Time | Total km | km Δ | Description | Turn | Road | Direction | |
|---|---|---|---|---|---|---|---|
| 00:00 | 0 | 0.1 | start | on | Bregenzer Strasse | NW | A81 |
| 00:00 | 0.1 | 0 | — | on | — | SW | A81 |
| 00:00 | 0.1 | 0 | — | bear to left to | — | SW | A81 |

-continued

| Time | Total km | km Δ | Description | Turn | Road | Direction | |
|---|---|---|---|---|---|---|---|
| 00:00 | 0.1 | 0.3 | — | bear to left to | B295/Steiermärker strasse | E | A81 |
| 00:01 | 0.4 | 0 | — | half left to | B295/Wiener Platz | E | A81 |
| 00:01 | 0.4 | 0.8 | — | on | B295/Borsigstrasse | NE | A81 |
| 00:03 | 1.2 | 0 | — | continue on | Heilbronner Strasse | E | A81 |
| 00:03 | 1.2 | 0.3 | — | bear to left to | B10/B27/Heilbronner Strasse | NW | A81 |
| 00:04 | 1.5 | 6.6 | — | bear to right on | B10/B27 | NE | A81 |
| 00:08 | 8.1 | 37.7 | AK Stuttgart-Zuffenhausen (17) | continue on | A81/E41 | N | A81 |
| 00:27 | 45.8 | 5.9 | — | continue on | A6/E50 | NW | AK Heilbronn/Neckarsulm |
| 00:30 | 51.7 | 47.2 | AK Heilbronn/Neckarsulm (37) | continue on | A6/E50 | NW | A6 |
| 00:54 | 98.9 | 7.1 | AK Walldorf (40)(31) | continue on | A6/E50 | NW | A6 |
| 00:58 | 106 | 11.1 | AD Hockenheim (30)(65) | continue right on | A61/E31 | N | A61 |
| 01:04 | 117.1 | 14.4 | AK Speyer (63) | continue on | A61/E31 | W | A61 |
| 01:12 | 131.5 | 3.4 | AK Mutterstadt (61)(7) | continue on | A61/E31 | NW | A61 |
| 01:14 | 134.9 | 8.7 | AK Ludwigshafen (60)(5) | continue on | A61/E31 | N | A61 |
| 01:18 | 143.6 | 0.2 | AK Frankenthal (21)(59) | right, stop at | — | N | A6 |
| 01:19 | 143.8 | 0.4 | — | straight ahead | AK Frankenthal | N | A6 |
| 01:19 | 144.2 | 0.5 | — | right, stop at | AK Frankenthal | N | A6 |
| 01:20 | 144.7 | 61.4 | — | straight ahead on | AK Frankenthal | W | A6 |
| 01:50 | 206.1 | 23.6 | AK Landstuhl (12)(10) | continue on | A6/E50 | W | A6 |
| 02:02 | 229.7 | 21.5 | AK Neunkirchen (8)(27) | continue on | A6/E50 | SW | A6 |
| 02:13 | 251.2 | 28 | AD Saarbrücken (3)(22) | continue on | A620 | W | A620 |
| 02:27 | 279.2 | 0.2 | AS Saarlouis-Mitte (3) | right, stop at | — | NW | — |
| 02:27 | 279.4 | 0.8 | AS Saarlouis-Mitte (3) | bear to right to | B405/Metzer Strasse | NE | — |
| 02:29 | 280.2 | 0.6 | — | bear to right to | B405/Ludwigstrasse | SE | — |
| 02:30 | 280.8 | 0.2 | — | bear to left to | Lisdorfer Strasse | N | — |
| 02:31 | 281 | 0.2 | — | on | Französische Strasse [French Road] | NW | — |
| 02:32 | 281.2 | — | destination | — | | | |

The procedure described so far is known to be used with the navigation devices currently available, e.g., from the company Blaupunkt-Werke GmbH, and therefore requires no further explanation.

After output of the calculated route, the user has the possibility of accepting the proposed route or of rejecting it, to which end a corresponding input is requested by controller 10 via user interface 16 (step 130). Controller 10 then checks (step 135) on whether the proposed trip route has been accepted or rejected.

If the proposed route has been accepted by a corresponding user input at user interface 16, the sequence is terminated (step 140). The navigation device will then guide the user/driver of the vehicle in a known manner through output of trip instructions via the output device of user interface 16 according to the calculated trip route from the current location to the destination. This navigation procedure is already associated with current navigation devices available from the company Blaupunkt-Werke GmbH of Hildsheim and therefore does not require further explanation.

In the case of the example described above of the route calculated for a planned trip from Stuttgart-Feuerbach to Saarlouis according to the route description given above, the driver of the vehicle is thus guided from the current vehicle location, namely Stuttgart-Feuerbach, to the next freeway, namely A81, in the direction of Heilbronn, then after the Heilbronn freeway junction, continuing on the A6 freeway further in the direction of Mannheim, then on the A61 freeway after the Heidelberg freeway cloverleaf, traveling in the direction of Worms; then back on the A6 highway after the Frankenthal freeway junction, traveling in the direction of Kaiserslautern, and finally continuing in the direction of Saarlouis after the Saarbrücken highway cloverleaf. The total distance thus amounts to 281.2 km and the estimated driving time is 2 hours, 32 minutes.

However, if the proposed route is rejected through a corresponding user input via the user interface (step 130) and this circumstance is ascertained by controller 10 (step 135), then the user is subsequently given an opportunity to indicate one or more pass-through destinations through which the route is to be calculated as a way of influencing the route calculation.

In the present case, the driver of the vehicle is aware of a route through the cities of Karlsruhe, Landau and Pirmasens which is actually shorter with regard to the distance to be traveled.

One or more pass-through destinations (step 145), i.e., in the present case the city names of Karlsruhe, Landau and Pirmasens, are input by analogy with the input of destinations described above via user interface 16.

In deviation from the procedure described here, it is also possible for the pass-through destination(s) to be input as early as before a first route calculation.

After input of each pass-through destination, it is stored in the destination memory stored as a pass-through destination data record in the destination memory together with the information available in bulk memory 14, the data on the pass-through destinations being flagged to differentiate it from the data on the destination by using a corresponding identifier assigned to the pass-through destination data record.

After conclusion of the input of the pass-through destination locations, the pass-through destination locations and/or the pass-through destination location data records are sorted, preferably according to decreasing distance of the pass-through destinations from the destination, in destination memory 18 or, according to a variant, an identifier characterizing their sequence in destination memory 18 is assigned to the data records on the pass-through destinations.

Then the following route calculation is initialized. To do so, a starting point for a first section of the route to be calculated is equated (step 150) with the starting location, i.e., the current location which was determined previously (step 115). In the case of the example given above of the planned trip from Stuttgart-Feuerbach to Saarlouis, this location is Stuttgart-Feuerbach. In addition, the pass-through destination to which the first route segment is to be calculated is equated with the first pass-through destination stored in destination memory 18 (step 155). In the example given above, the pass-through destination is thus determined as the city of Karlsruhe.

Calculation of a route section after the initialization, performed immediately previously, of the first route section from the starting point, i.e., the starting location or the current location, to the pass-through destination (step 160) is performed as follows.

The route segment is calculated in a manner which is already known from the previously known navigation devices, for example, with the main difference being that a route segment is not calculated to the pass-through destination itself, i.e., the city center of the given pass-through destination city, for example, but instead to a certain environment of the pass-through destination, which is calculated according to a specified criterion. The route calculation of the current route segment thus ends on reaching the specified environment of the predefined pass-through destination, so the end point of the calculated route segment is in the circumscribed area of the pass-through destination.

The end point of the route segment calculated is determined in detail as follows.

First, the route calculation algorithm, which is usually implemented in the form of a reverse iterative Ford-Moore algorithm, calculates the route segment from the current position to a precisely defined point within the pass-through destination. For example, if the city name "Karlsruhe" has been input as a pass-through destination, then a representative point in the pass-through destination, e.g., the city center, or more precisely a certain point in the heart of the city of Karlsruhe, is determined as the pass-through destination from the bulk memory. Then a provisional partial route from the current location, i.e., Stuttgart-Feuerbach, for example, to the aforementioned point within the pass-through destination of Karlsruhe is calculated. To do so, the route searching algorithm aligns road segments in succession, starting from the known pass-through destination (Karlsruhe, city center) progressively in the direction of the starting location or current location in such a way that the trip duration over the resultant partial route is minimized. In a next step, the point of intersection of the calculated provisional partial route with the circumscribed area of the pass-through destination (Karlsruhe, city center) is determined and is set as the pass-through destination point and thus as the end point of the first partial route so that the resultant partial route ends at or in the aforementioned circumscribed area of the pass-through destination.

Instead of inputting only the place name, for example, of a pass-through destination, as an alternative it may also be provided that the pass-through destination must be input in input of the final destination by a similar procedure, i.e., as input of a precise point within the pass-through destination location, e.g., in the form of both the place name and the street name. In comparison with the procedure described above, this has the advantage that the software required to control the input of destinations need not be adapted in a complex manner. A provisional partial route is then calculated to the exact point on the pass-through destination thus input, e.g., to a certain street within the city of Karlsruhe, the name of which has been input in addition to the pass-through destination city name of "Karlsruhe." Otherwise, the pass-through destination point and thus the end point of the partial route are determined as described above. Thus the circumscribed area criterion explained in greater detail above is applied to the partial route calculated on a provisional basis; for example, the point of intersection of an imaginary circle having a given radius about the exact pass-through destination which has been input, with the provisional partial route is determined, and the point determined according to this criterion, i.e., here the point of intersection of the circle with the partial route determined provisionally, is determined as the end point of the partial route.

The specified criterion defining the environment of the pass-through destination or the interception range around the pass-through destination may include one of the three criteria described below or a logic OR operation on at least two criteria or on all three criteria, so that in the case when one of the three criteria is met, the environment of the pass-through destination is defined by this criterion, and a point situated on the route segment currently calculated and inside this environment around the pass-through destination currently being considered becomes the end point of the route segment.

A first criterion defining the circumscribed area around the pass-through destination is a circle around the intermediate destination which is fixedly specified by a certain distance value of 20 km, for example. Thus, if the route calculation gets within the intended distance value of 20 km, for example, to the pass-through destination, then the point reached is regarded as the end point of the route calculation of the route segment currently being calculated. In the case of the example described above, the route calculation would thus be terminated on reaching a straight line distance of 20 km from the city center of the first pass-through destination, Karlsruhe, on the A8 freeway. The end point of the route segment calculated last, situated on the A8 freeway, 20 km away from the city center of Karlsruhe, would be the starting point for calculating the next route segment to the next intermediate destination, namely Landau in the present case.

The path description of the first route segment calculated up to the route segment calculated according to the criterion for determining the circumscribed area around the pass-through destination according to the first exemplary embodiment would be as follows, the last entry being based not on measurement results but instead on rough estimates.

previously or, as an alternative, the sum of lengths of the route segments calculated previously and amounting to 5% of the length of the route segment(s) calculated previously, for example. In the case of the example of a planned trip from Stuttgart-Feuerbach to Saarlouis by way of Karlsruhe, Landau and Pirmasens, as described above, the circumscribed area around the city center of Karlsruhe would thus amount to 5% of the distance from the starting point Stuttgart-Feuerbach to the current position. The end point of the route segment currently being calculated would thus be situated inside this circumscribed area and would then be set in step 165 as the starting point for calculating the next route segment to the next pass-through destination, namely Landau. A variant of the second criterion may involve the distance value which defines the circumscribed area amounting to a specified amount of, for example, again 5% of the total length of the trip route. Since the total length of the trip route at the time of the route calculation is not yet known, the straight line distance between the starting location and the destination location or the segment length of the trip route calculated without user specification of pass-through destination locations may be used as a substitute for this in rough approximation.

A third criterion for establishing the circumscribed area around the pass-through destination is a change in class or in the case of a road a change in the road class of a traffic route to be used, this change being required to reach the pass-through destination, in particular a change to a traffic route of a lower class. Such a change in road class would be, for example, leaving a freeway to enter a federal, state, county or other road or driving on a local through road after being on a federal road. In the example given above of the planned trip from Stuttgart-Feuerbach to Saarlouis by way of the pass-through destination of Karlsruhe, on reaching the freeway cloverleaf, it is necessary to change to freeway A5, traveling in the direction of Frankfurt, and after traveling a short distance on A5, it is necessary to leave the freeway and enter a road of a lower road class in comparison with the A5 freeway driven on last. Thus in the present case, the cir-

| Time | Total km | km Δ | Description | Turn | Road | Direction | |
|------|----------|------|-------------|------|------|-----------|---|
| 00:00 | 0 | 0.1 | Start | on | Bregenzer Strasse | NW | A81 |
| 00:00 | 0.1 | 1.1 | — | on | — | SW | A81 |
| 00:03 | 0.2 | 1.5 | — | on | B295/Föhrich strasse | W | A81 |
| 00:06 | 2.7 | 1.5 | — | continue on | B295 | W | A81 |
| 00:08 | 4.2 | 3.1 | — | on | B295/Ditzinger Strasse | W | A81 |
| 00:14 | 7.3 | 0.5 | — | continue on | B295/Weilimd-orfer Strasse | W | A81 |
| 00:15 | 7.8 | 6.7 | AS Stuttgart-Feuerbach (18) | bear to left to | A81/E41 | S | A81 |
| 00:19 | 14.5 | 52 | AD Leonberg (49)(19) | continue right, at | A8/E52 | SW | A8 |
| 00:40 | 60.0 | 2 | — | continue on | A8/E52 | NW | A8 |

A second criterion defining the circumscribed area around the pass-through destination is a distance value which is derived from the length of the route segment calculated cumscribed area around the pass-through destination would be defined by this departure from the A5 freeway which represents the end point of the route calculation for the route segment currently being calculated. A subsequent route segment would thus be determined from the aforementioned departure from A5 to the next pass-through destination of Landau.

The route description of the first route segment calculated according to the criterion for determining the circumscribed area around the pass-through destination according to the third exemplary embodiment would be as follows, but the last entry would no longer belong to the route segment and is shown here only for the purpose of illustration.

| Time | Total km | km Δ | Description | Turn | Road | Direction | |
|---|---|---|---|---|---|---|---|
| 00:00 | 0 | 0.1 | start | on | Bregenzer Strasse | NW | A81 |
| 00:00 | 0.1 | 1.1 | — | on | — | SW | A81 |
| 00:03 | 1.2 | 1.5 | — | on | B295/Föhrich strasse | W | A81 |
| 00:06 | 2.7 | 1.5 | — | continue on | B295 | W | A81 |
| 00:08 | 4.2 | 3.1 | — | on | B295/Ditzinger Strasse | W | A81 |
| 00:14 | 7.3 | 0.5 | — | continue on | B295/Weilimdorfer Strasse | W | A81 |
| 00:15 | 7.8 | 6.7 | AS Stuttgart-Feuerbach (18) | bear to left on | A81/E41 | S | AD Leonberg |
| 00:19 | 14.5 | 52 | AD Leonberg (49)(19) | continue right on | A8/E52 | SW | A8 |
| 00:48 | 66.8 | 2 | AD Karlsruhe (46)(41) | continue right on | A5/E35 | W | A5 |
| 00:50 | 68.8 | 0.2 | AS Karlsruhe-Mitte (45) | continue right on | — | N | A65 |

The list of possible embodiments of the criterion for definition of the circumscribed area of the pass-through destination is not definitive. Other embodiments of the criterion are also conceivable and are within the scope of the present invention. In particular, combinations of the criteria are conceivable, e.g., such that the criterion defining the widest circle also defines the circumscribed area.

An especially advantageous embodiment of such a combinatory criterion is a change in road class within a circle around the pass-through destination which is specified by a specified distance value and is necessary for reaching the pass-through destination. In concrete terms, such a criterion may be a change in road class within a distance of 15 km from the pass-through destination, this change being necessary to reach the pass-through destination. To do so, the partial route calculated as a provisional route as described above would be checked for a change in road class, in particular to a road class of a lower order, i.e., for example, from freeway to federal or state roads within the specified straight line distance from the exact pass-through destination. In the present case, the exit AS Karlsruhe (45) from the A5 freeway to the county road K9657 within the circle of 15 km from the center of the city would thus be determined as the first intermediate destination point and thus the end point for the first partial route. After successful calculation of the first route segment, the starting point for calculation of another route segment would be equated with the end point of the route segment described above (step 165). After calculating the first route segment according to the above example from Stuttgart-Feuerbach to the vicinity of Karlsruhe, the new starting point would be said end point in the vicinity of Karlsruhe; after calculation of the second route segment it would be an end point in the area of the second pass-through destination of Landau, and after calculation of the third route segment it would be the end point of the third route segment in the vicinity of Pirmasens.

If no other pass-through destination points taken into account for the preceding route segment calculation are present in destination memory 18, which is checked by the controller in step 170, then the last route segment, namely starting from the current starting point, i.e., the end point of the route segment calculated last, to the destination location is calculated (step 175).

The calculated route is formed after completion of the route calculation of the route's last route segment by arranging the calculated route segments in a sequence (step 180). Controller then causes the complete trip route to be output on the display device of user interface 16 (step 125).

However, if it is found in step 170 that additional pass-through destination locations in addition to that already taken into account for the route calculation are stored in destination memory 18, then the pass-through destination is equated with the next of the additional pass-through destinations (step 185) and subsequently the route segment from the new starting point, namely the end point of the route segment calculated last, to the pass-through destination is calculated (step 160).

The sequence then goes to step 165 and the following steps, as described above.

In the above-described example of a planned trip from Stuttgart-Feuerbach to Saarlouis via the pass-through destinations of Karlsruhe, Landau and Pirmasens specified by the user in step 145 via user interface 16, this yields a trip route as shown below in the following route description on the basis of the procedure described here for route calculation.

Path description of the trip route according to user definition of the pass-through destinations Karlsruhe, Landau and Pirmasens:

| Time | Total km | km Δ | Description | Turn | Road | Direction | |
|---|---|---|---|---|---|---|---|
| 00:00 | 0 | 0.1 | start | on | Bregenzer Strasse | NW | A81 |
| 00:00 | 0.1 | 1.1 | — | on | — | SW | A81 |
| 00:03 | 1.2 | 1.5 | — | on | B295/Föhrich strasse | W | A81 |
| 00:06 | 2.7 | 1.5 | — | continue on | B295 | W | A81 |
| 00:08 | 4.2 | 3.1 | — | on | B295/Ditzinger Strasse | W | A81 |
| 00:14 | 7.3 | 0.5 | — | on | B295/Weilimdorfer Strasse | W | A81 |
| 00:15 | 7.8 | 6.7 | AS Stuttgart-Feuerbach (18) | bear to left to | A81/E41 | S | AD Leonberg |
| 00:19 | 14.5 | 52 | AD Leonberg (49)(19) | continue right on | A8/E52 | SW | A8 |
| 00:48 | 66.8 | 2 | AD Karlsruhe (46)(41) | continue right on | A8/E35 | W | A5 |
| 00:50 | 68.8 | 0.2 | AS Karlsruhe-Mitte (45) | continue right on | — | N | A65 |
| 00:50 | 69 | 1.1 | — | straight ahead on | — | NE | A65 |
| 00:51 | 70.1 | 2.5 | — | continue on | K9657 | NW | A65 |
| 00:52 | 72.6 | 0.8 | — | on | Edeltrud Tunnel | W | A65 |
| 00:54 | 73.4 | 11 | — | on | K9657 | W | A65 |
| 01:00 | 83.9 | 24 | AK Wörther intersection (3) | continue on | A65 | W | A65 |
| 01:14 | 108.2 | 0.5 | AS Landau north (15) | continue right on | — | N | A8 |
| 01:15 | 108.7 | 13 | — | on | — | W | A8 |
| 01:28 | 121.4 | 6.4 | — | bear to right on | B10 | SW | A8 |
| 01:40 | 127.8 | 0.1 | in roundabout traffic, 16th exit ramp | continue right on | B48 | NW | A8 |
| 01:40 | 127.9 | 0 | — | bear to left on | B48 | SW | A8 |
| 01:40 | 127.9 | 15 | — | bear to right, on | B10 | NW | A8 |
| 01:56 | 142.5 | 4.7 | — | half right on | B10 | W | A8 |
| 02:01 | 147.2 | 12 | — | straight ahead on | B10 | W | A8 |
| 02:18 | 159.2 | 0.1 | AS Pirmasens (15) | continue right on | A8 | NW | AK Neunkirchen |
| 02:18 | 159.3 | 30 | — | bear to right on | A8 | N | AK Neunkirchen |
| 02:35 | 189.4 | 7.9 | AK Neunkirchen (8)(27) | continue on | A8 | NW | A8 |
| 02:40 | 197.3 | 6.3 | AD Neunkirchen/ Spiesen (23) | continue on | A8 | W | A8 |
| 02:44 | 203.6 | 5.9 | AD Friedrichsthal (20)(1) | continue on | A8 | NW | A8 |
| 02:47 | 209.5 | 19 | AK Saarbrücken (143)(17) | continue on | A8 | NW | A8 |
| 02:57 | 228.5 | 0.1 | AS Saarwellingen (13) | continue right, on | — | N | — |
| 02:57 | 228.6 | 0.1 | — | continue on | — | N | — |
| 02:58 | 228.7 | 1.2 | AS Saarwellingen (13) at end of road | bear to left on | B405 | SW | — |
| 02:59 | 229.9 | 1.9 | — | on | B405/Lebacher Strasse | SW | — |
| 03:04 | 231.8 | 0.8 | at end of road | bear to right on | B405/B511/ Banhofstrasse | W | — |
| 03:06 | 232.6 | 0.4 | — | continue on | B51/Schanzen strasse | W | — |
| 03:06 | 233 | 0.4 | — | bear to left on | B51/ Holtzendorfer Strasse | SW | — |
| 03:08 | 233.4 | 0.6 | — | on | Holtzendorfer Strasse | SW | — |
| 03:09 | 234 | 0.3 | — | on | Deutsche Strasse | SE | — |
| 03:10 | 234.3 | 0.1 | — | on | Französische Strasse | SE | — |
| 03:11 | 234.4 | — | destination | — | — | — | — |

As shown by the path description for the trip route calculated on the basis of the pass-through destinations specified by the user, it leads over other traffic routes than the trip route calculated without corresponding user specifications. The calculated alternative trip route according to trip instructions leads onto the A81 freeway, traveling in the direction of Karlsruhe, via the A8 freeway, traveling in the direction of Karlsruhe, through Karlsruhe in the direction of Landau on A65 and from there over the B10 in the direction of Pirmasens and from there over A6 and the extension thereof, A620, to Saarlouis.

Thus by specifying the pass-through destinations, a different route course is forced such that the route leads through a vicinity of the intermediate destinations which is specified according to the criterion given above. In the present case, including federal road B10 yields a much shorter route length in comparison with the trip route calculated without user specifications, although at the expense of a possibly longer trip duration, as is apparent from a comparison of the path descriptions.

The method described here makes available a trip route for subsequent navigation so that the driver of the vehicle is directed along this route by acoustic and/or visual driving instructions. If the driver of the vehicle leaves the calculated trip route due to failure to follow a trip instruction or an unforeseen driving maneuver and if returning to the trip route calculated originally is impossible or too complicated, e.g., when driving onto an autobahn in the wrong direction or something similar, it may be necessary to recalculate the route. For such a recalculation of route, the current vehicle location at that moment is regarded as the starting point and the recalculation of the route is otherwise performed in the manner already described. As an alternative, it is also possible in this situation for the pass-through destinations specified by the user to be further taken into account for the required recalculation, in which case the user is given an opportunity through display or output of the recalculated route (in step 125) to delete originally specified pass-through destinations which might be considered inappropriate for the recalculated route because they are associated with detours, for example, by entering new pass-through destinations (in step 145).

The method according to the present invention may be used as part of an advance calculation of the trip route at the starting location and also in the form of an online route calculation during navigation. The online route calculation may be carried out in such a manner that the route is first calculated from the starting location to the first pass-through destination. The driver of the vehicle is then guided into the circumscribed area of the pass-through destination, depending on the route segment calculated. On reaching the circumscribed area of the pass-through destination defined according to the criterion given above, the calculation of the next route segment from the current vehicle location which is in the circumscribed area of the pass-through destination to the next pass-through destination or to the destination city is begun in the manner indicated.

In addition, the method according to the present invention may also be applied to offboard route calculations in such a way that the route segments are calculated by a service provider after transmission of the starting location determined or the current location, the destination specified by the user and the user-defined pass-through destinations via air interface 15, on the basis of traffic route information available to the service provider and, if necessary, additional information about the condition of the traffic routes. The route segments or the information describing them, such as interpolation points to be reached, on the basis of which the onboard navigation device fixedly installed in the vehicle interpolates a trip route, is then transmitted by the service provider via air interface 15 to onboard navigation device 1 for the purpose of navigation and is stored there.

What is claimed is:

1. A method for performing a route calculation from a starting location to a destination location, comprising:
   specifying at least one pass-through destination location;
   after specifying the at least one pass-through destination location, determining at
   least one pass-through destination point automatically for each of the at least one pass-through destination location, the at least one pass-through destination point being situated in a circumscribed area of the at least one pass-through destination location, determined by a specified criterion; and
   calculating the route via the at least one pass-through destination point.

2. The method as recited in claim 1, wherein:
   the specified criterion is a specified distance from the at least one pass-through destination location.

3. The method as recited in claim 2, wherein:
   the specified distance is one of a fixedly specified distance value and a specifiable distance value.

4. The method as recited in claim 2, wherein:
   the specified distance is derived from a calculated route length.

5. The method as recited in claim 2, wherein, depending on which criterion defines a wider circumscribed area, one of:
   the specified distance is one of a fixedly specified distance value and a specifiable distance value, and
   the specified distance is derived from a calculated route length.

6. A method for performing a route calculation from a starting location to a destination location, comprising:
   specifying at least one pass-through destination location;
   after specifying the at least one pass-through destination location, determining at least one pass-through destination point automatically for each of the at least one pass-through destination location, the at least one pass-through destination point being situated in a circumscribed area of the at least one pass-through destination location, determined by a specified criterion;
   calculating the route via the at least one pass-through destination point;
   setting the starting location as a starting point for the route calculation;
   setting a first pass-through destination location of the at least one pass-through destination location;
   calculating a first route segment from the starting point to the at least one pass-through destination point that is determined automatically and is situated in an interception range about the first pass-through destination location, determined according to the specified criterion;
   setting a first end point of the first route segment as a second starting point for a calculation of a second route segment;
   with respect to an additional pass-through destination location, setting a next pass-through destination location of the at least one pass-through destination location as a second pass-through destination location;
   calculating the second route segment from the second starting point to the at least one pass-through destination point that is determined automatically and is situated in the interception range about the second pass-through destination location, determined according to the specified criterion;

setting a second end point of the second route segment as a third starting point for a calculation of a third route segment;

with respect to no additional pass-through destination location, calculating the first route segment from the second starting point to the first pass-through destination location; and obtaining the route by arranging each calculated route segment in a sequence.

7. A method for performing a route calculation from a starting location to a destination location, comprising:

specifying at least one pass-through destination location;

after specifying the at least one pass-through destination location, determining at least one pass-through destination point automatically for each of the at least one pass-through destination location, the at least one pass-through destination point being situated in a circumscribed area of the at least one pass-through destination location, determined by a specified criterion; and calculating the route via the at least one pass-through destination point, wherein the specified criterion is a change in road class for reaching the at least one pass-through destination location.

8. The method as recited in claim 7, wherein:

the specified criterion is a change in road class to a road of a lower class road, the change being for reaching the at least one pass-through destination location.

9. A method for performing a route calculation from a starting location to a destination location, comprising:

specifying at least one pass-through destination location;

after specifying the at least one pass-through destination location, determining at least one pass-through destination point automatically for each of the at least one pass-through destination location, the at least one pass-through destination point being situated in a circumscribed area of the at least one pass-through destination location, determined by a specified criterion; and calculating the route via the at least one pass-through destination point, wherein the specified criterion is a change in road class for reaching the at least one pass-through destination location, within a specified distance from the at least one pass-through destination location.

* * * * *

UNITED STATES PATENT AND TRADEMARK OFFICE
CERTIFICATE OF CORRECTION

PATENT NO. : 7,072,765 B2 Page 1 of 1
APPLICATION NO. : 10/343407
DATED : July 4, 2006
INVENTOR(S) : Schmidt et al.

It is certified that error appears in the above-identified patent and that said Letters Patent is hereby corrected as shown below:

On the face of the patent, #(57) Abstract, lines 8-9, delete "In contrast with the route calculation method known from the related art,"

On the face of the patent , #(57) Abstract, line 8, change "the" to --The--

Column 1, line 3, change "BACKGROUND INFORMATION" to --FIELD OF THE INVENTION--

Column 1, line 5, change "is directed to" to --related to--

Column 1, lines 8-9, change "location according to the preamble of the independent patent claim --location--

Column 1, line 9, insert heading --BACKGROUND INFORMATION--

Column 1, line 52, change "Advantages of the Invention" to --SUMMARY OF THE INVENTION--

Column 1, lines 54-55, delete "having the features of the independent claim"

Signed and Sealed this

Fourteenth Day of November, 2006

JON W. DUDAS
*Director of the United States Patent and Trademark Office*